United States Patent [19]

Friedwald

[11] Patent Number: 4,954,069
[45] Date of Patent: Sep. 4, 1990

[54] APPARATUS FOR MOLDING CHOCOLATE BARS

[76] Inventor: Franklin Friedwald, 3781 Mahlon Brower Dr., Oceanside, N.Y. 11572

[21] Appl. No.: 311,475

[22] Filed: Feb. 15, 1989

Related U.S. Application Data

[63] Continuation-in-part of Ser. No. 138,960, Dec. 29, 1987, abandoned.

[51] Int. Cl.⁵ .................. B29C 39/06; A23G 1/26
[52] U.S. Cl. .................................. 425/453; 198/712;
198/803.2; 249/120; 425/218; 426/515
[58] Field of Search ............... 249/120, 127, 129, 134, 249/139, 203; 425/218, 220, 359, 362, 453; 426/515; 198/712, 803.2

[56] References Cited

U.S. PATENT DOCUMENTS

| | | | |
|---|---|---|---|
| 3,778,018 | 12/1973 | Abalo | 249/120 |
| 4,044,161 | 8/1977 | Tanara | 426/421 |
| 4,129,209 | 12/1978 | Mayfeld | 198/712 |
| 4,229,484 | 10/1980 | Steels et al. | 426/279 |
| 4,883,167 | 11/1989 | Shibata | 198/712 |
| 4,890,722 | 1/1990 | Gough | 198/712 |

FOREIGN PATENT DOCUMENTS

| | | | |
|---|---|---|---|
| 2517660 | 10/1975 | Fed. Rep. of Germany | 249/203 |
| 2537955 | 3/1976 | Fed. Rep. of Germany | 425/375 |

Primary Examiner—James C. Housel
Attorney, Agent, or Firm—Alfred M. Walker

[57] ABSTRACT

In a machine for moulded chocolate bars of the type having a pair of chains, a plurality of carriers attached to the chains and separate moulds mounted in the carriers; the present invention combines mould and carrier into one piece having a mould and sheath slots to directly connect the mould to pins connected to the chains on machines designed for separate carriers and moulds.

2 Claims, 3 Drawing Sheets

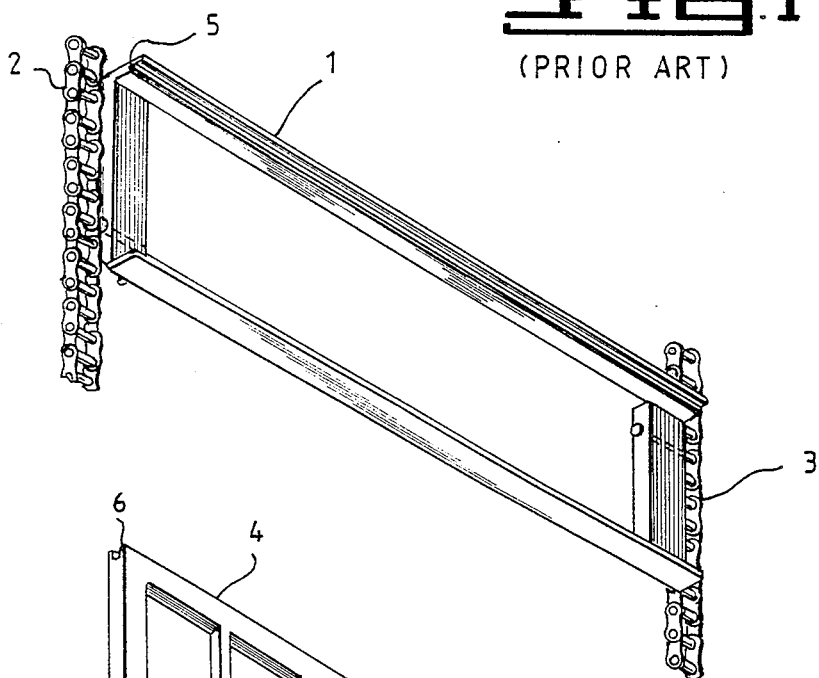
Fig. 1 (PRIOR ART)
Fig. 2 (PRIOR ART)
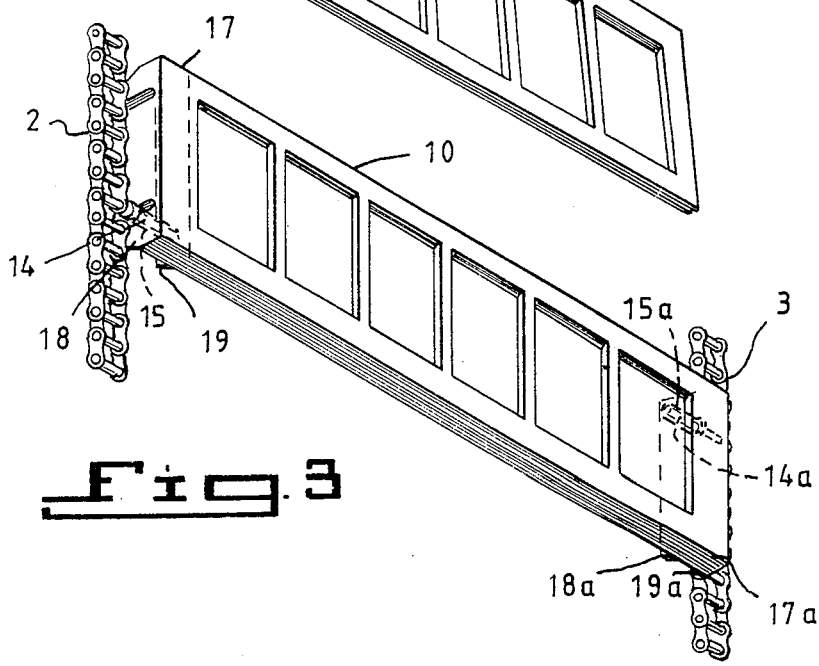
Fig. 3

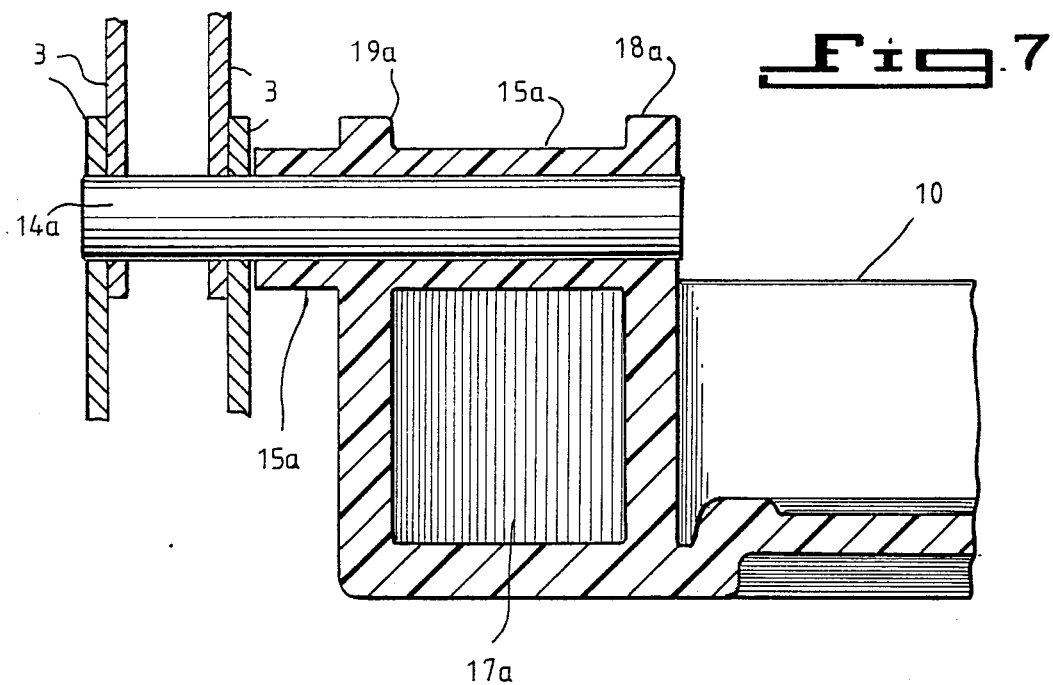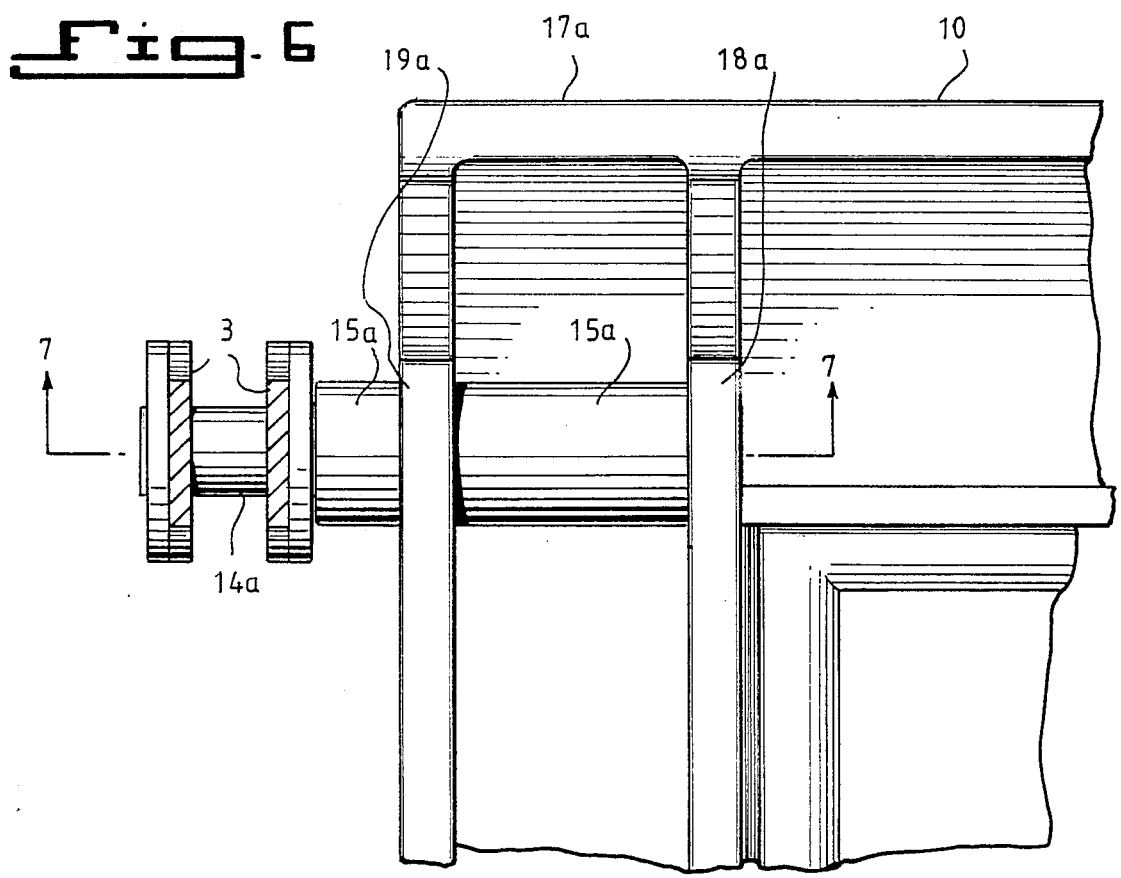

APPARATUS FOR MOLDING CHOCOLATE BARS

This application is a continuation-in-part of application Ser. No. 07/138,960 filed Dec. 29, 1987, now abandoned.

This invention relates to machines for moulding candy bars, for instance chocolate bars, and more particularly, for means to combine the mould and carrier in a chain type moulding machine, originally designed for separate carriers and moulds. The device includes a unitary lightweight plastic piece which incorporates the functions of the mould and the carrier. In particular, a fastening means is provided to accommodate pins for supporting the device, which pins extend integrally from the supporting chain into sheaths which form part of the unitary mould/carrier piece.

PRIOR ART

Machines were generally of the type having a pair of chains carrying carriers. The moulds were placed inside the carriers. Since the carrier pieces were of metal they constituted a very heavy weight since there were very many carriers on a machine. In addition, other dual mould/carrier devices are disclosed in Steels, U.S. Pat. No. 4,229,484, German Patents Nos. 2,517,660 and 2,537,955.

THE INVENTION

The present invention combines the carrier and the mould in one piece as a lightweight unitary plastic piece for use with existing machines designed to take separate carriers and moulds. In the existing machines the carriers are supported by pins extending from supporting chains.

OBJECTS

A principal object of the invention is to provide new and improved moulding means for food products.

Another object of the invention is to provide new and improved means for moulding chocolate bars.

Another object of the invention is to provide a new and improved mould for machines of the type having a pair of chains, a plurality of carriers attached to the chains and separate moulds mounted in the carriers having means to combine a mould and carrier into one piece and means to directly connect the mould to the chains.

It is a further object to provide an attachment means for accommodating pins integrally attached to supporting chains.

It is a further object to provide a lightweight, stable unitary mould carrier.

BRIEF DESCRIPTION OF FIGURES

FIG. 1 is a perspective view of a typical prior machine having a pair of chains and a carrier mounted on the chains.

FIG. 2 is a view of a prior art plastic mould.

FIG. 3 is a perspective view of an embodiment of the invention.

FIG. 6 is a closeup view with the bottom up of the attaching means of the invention.

FIG. 7 is a closeup side view in section with the bottom up of the attaching means of the invention.

Referring to the figures, FIG. 1 shows a Prior Art metal carrier 1, mounted on a pair of chains 2 and 3, and FIG. 2 shows a plastic mould 4 which is adapted to slide into the carrier 1 by means of the slots 5 on the carrier end 6 on the mould. Pins 14 and 14a are built into chains 2 and 3.

Figure 4:
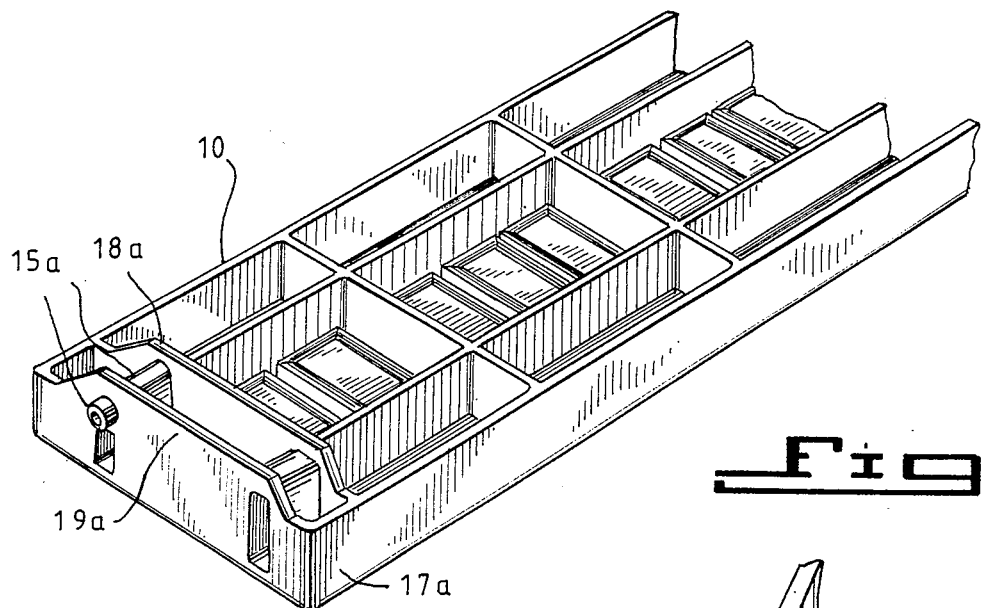
FIG. 4 is a closeup perspective view with the bottom up of the attaching means of the invention.
Figure 5:
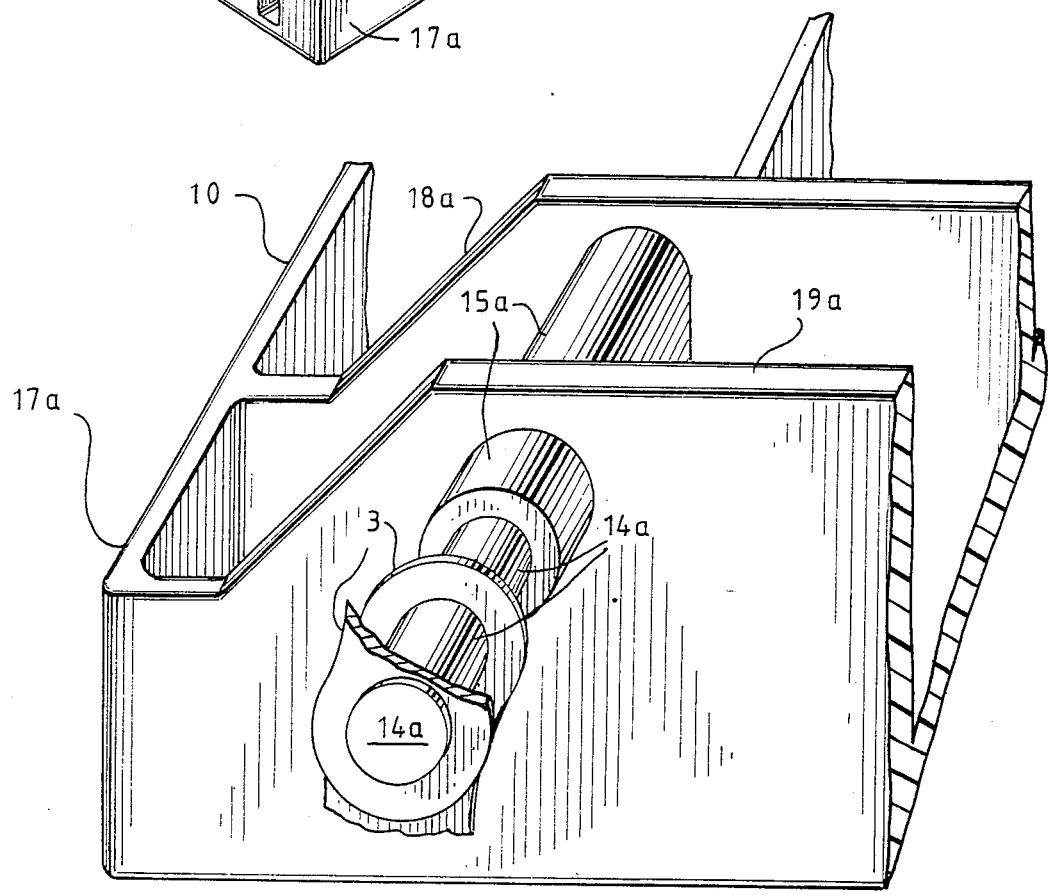
FIG. 5 is a closeup perspective view with the bottom up of the attaching means of the invention.

In the Prior Art the carriers were of metal, which created a very heavy load on the moulding machine. The wear and tear of the metal carriers occasionally causes minute splintering of the metal, thus contaminating the chocolate. In the moulding machine the chains carried them past various operation points where the moulds were loaded with the products; for instance, chocolate bars, and then moved on to other operation points for cooling and demoulding, etc.

FIG. 3 shows an embodiment of the present invention which is a combined mould and carrier 10, which is adapted to be mounted on the chains 2 and 3 by means of pins 14 and 14a, which are directly mounted on the chains.

The present invention, comprising the mould combined with the carrier, may be mounted in one unitary plastic piece of lightweight plastic. The present invention is mounted on the chains by spreading the chains apart so that the pins 14 and 14a fit into the corresponding sheath slots 15 and 15a in the carrier mould. Sheath slots 15 and 15a also provide structural support for brace mechanisms 17 and 17a, which have downwardly extending extensions 18 and 18a parallel to downwardly extending extensions 19 and 19a, such that sheath slots 15 and 15a join extensions 18 and 19 and 18a and 19a respectively in a direction perpendicular to the surface areas of extensions 18 and 19 and 18a and 19a respectively.

The invention is not limited to chocolate bars but may be used for other products.

I claim:

1. A machine for moulding chocolate bars, said machine comprising:
    a pair of spaced apart conveyor chains, each chain having a plurality of spaced apart pins extending toward the other chain;
    a plurality of unitary mould and carrier combinations each including at least one mould cavity depending from an upper horizontally extending wall of said mould and carrier combination and means for connecting each end of said combination directly to a respective adjacent chain, said means on each said end including a sheath slot extending from at least one downwardly extending wall, said wall extending downwardly from said upper wall of said mould and carrier combination and spaced from said cavity.

2. The invention as described in claim 1, wherein said sheath slot extends from one downwardly extending wall to a second downwardly extending wall, said sheath slot being positioned between said pair of walls, said walls extending downwardly from an upper wall of said mould and carrier combination.

* * * * *